United States Patent
Tian et al.

(10) Patent No.: US 12,182,007 B2
(45) Date of Patent: Dec. 31, 2024

(54) METHOD FOR TESTING APPLICATION

(71) Applicant: BEIJING BAIDU NETCOM SCIENCE TECHNOLOGY CO., LTD., Beijing (CN)

(72) Inventors: Cong Tian, Beijing (CN); Yumin Tang, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/013,521

(22) PCT Filed: Jun. 1, 2022

(86) PCT No.: PCT/CN2022/096661
§ 371 (c)(1),
(2) Date: Dec. 28, 2022

(87) PCT Pub. No.: WO2023/115831
PCT Pub. Date: Jun. 29, 2023

(65) Prior Publication Data
US 2024/0104005 A1    Mar. 28, 2024

(30) Foreign Application Priority Data
Dec. 23, 2021   (CN) .......................... 202111590219.8

(51) Int. Cl.
*G06F 11/36*   (2006.01)
*G06F 8/61*   (2018.01)
(52) U.S. Cl.
CPC ............ *G06F 11/3684* (2013.01); *G06F 8/61* (2013.01)
(58) Field of Classification Search
CPC ......... G06F 11/36; G06F 11/3684; G06F 8/61
See application file for complete search history.

(56) References Cited

U.S. PATENT DOCUMENTS 11,169,908 B1 *  11/2021  Lu ........................ G06F 11/3608
11,301,109 B1 *  4/2022   Wang ................... G06F 3/04812
(Continued)

FOREIGN PATENT DOCUMENTS

| CN | 103605656 A | 2/2014 |
| CN | 106528851 A | 3/2017 |

(Continued)

OTHER PUBLICATIONS

Zhang, Fuguo, Research on Hybrid Recommendation Method Based on User Behavior Characteristics, Master Dissertation, Jiangxi University of Finance and Economics, 63 pages.

*Primary Examiner* — Kamini B Patel
(74) *Attorney, Agent, or Firm* — MASCHOFF BRENNAN; Liang Huang

(57) ABSTRACT

The present application discloses a test method and apparatus for an application, an electronic device, and a storage medium, relates to the field of test technologies, and may be applied to the fields of artificial intelligence and big data technologies. A specific solution includes: obtaining, from a target APP, a first recommended item for being selected, where the target APP is an APP of interest to a target user; triggering the target APP to open a first sub-page corresponding to the first recommended item for being selected when the first recommended item for being selected matches target information of interest, where the target information of interest is information of interest to the target user; and determining a test result for the target APP based on a matching degree between a first target recommended item and the target information of interest, where the first target recommended item includes a recommended item generated by the target APP after the first sub-page is opened on the target APP. According to the technical solutions of the present disclosure, the use of an app by a user may be
(Continued)

simulated, so that a recommendation effect of the app is automatically tested.

15 Claims, 4 Drawing Sheets

(56) References Cited

U.S. PATENT DOCUMENTS

| | | | |
|---|---|---|---|
| 11,599,449 B2* | 3/2023 | Lu | ............................ G06N 3/04 |
| 2004/0243604 A1 | 12/2004 | Gross | |
| 2020/0134696 A1 | 4/2020 | Lardeux et al. | |
| 2020/0226479 A1 | 7/2020 | Germanakos et al. | |
| 2021/0012031 A1 | 1/2021 | Rich et al. | |
| 2022/0027259 A1* | 1/2022 | Lu | ........................ G06F 11/3664 |
| 2023/0012904 A1* | 1/2023 | Xiao | ........................ H04L 67/34 |
| 2023/0017859 A1* | 1/2023 | Li | ........................ H04L 65/403 |
| 2023/0073045 A1* | 3/2023 | Bi | .................... H04N 21/47217 |

FOREIGN PATENT DOCUMENTS

| | | |
|---|---|---|
| CN | 107818105 A | 3/2018 |
| CN | 109788322 A | 5/2019 |
| CN | 110472148 A | 11/2019 |
| CN | 110555155 A | 12/2019 |
| CN | 110602532 A | 12/2019 |
| CN | 110647459 A | 1/2020 |
| CN | 110874787 A | 3/2020 |
| CN | 111190801 A | 5/2020 |
| CN | 112214670 A | 1/2021 |
| CN | 112528150 A | 3/2021 |
| CN | 113744002 A | 12/2021 |
| CN | 114265777 A | 4/2022 |
| JP | 2016177690 A | 10/2016 |

* cited by examiner

METHOD FOR TESTING APPLICATION

CROSS-REFERENCE TO RELATED APPLICATIONS

The present application claims priority to Chinese Patent Application No. 202111590219.8, filed on Dec. 23, 2021, and entitled "TEST METHOD AND APPARATUS FOR APPLICATION, ELECTRONIC DEVICE AND STORAGE MEDIUM", the content of which is incorporated herein by reference in its entirety for all purposes.

TECHNICAL FIELD

The present disclosure relates to the field of computer technologies, particularly to the fields of artificial intelligence and big data technologies.

BACKGROUND ART

When a user uses an application (APP), the APP may build a user portrait according to usage habits of the user to analyze preferences of the user, so as to recommend content of more interest to the user. However, there is currently no method that can be used to test a recommendation effect of the APP.

SUMMARY OF THE INVENTION

The present disclosure provides a method for testing an application, an electronic device, and a storage medium.

According to an aspect of the present disclosure, a method for testing an application is provided. The method includes obtaining, from a target application, a first recommended item for being selected, where the target application is an application of interest to a target user; in response to the first recommended item for being selected matching target information of interest, triggering the target application to open a first sub-page corresponding to the first recommended item for being selected, where the target information of interest is information of interest to the target user; and determining a test result for the target application based on a matching degree between a first target recommended item and the target information of interest, where the first target recommended item comprises a first recommended item generated by the target application after the first sub-page is opened on the target application.

According to an aspect of the present disclosure, an electronic device is provided. The electronic device includes one or more processors and a memory storing one or more programs configured to be executed by the one or more processors. The one or more programs comprises instructions for: obtaining, from a target application, a first recommended item for being selected, where the target application is an application of interest to a target user; in response to the first recommended item for being selected matching target information of interest, triggering the target application to open a first sub-page corresponding to the first recommended item for being selected, where the target information of interest is information of interest to the target user; and determining a test result for the target application based on a matching degree between a first target recommended item and the target information of interest, where the first target recommended item comprises a first recommended item generated by the target application after the first sub-page is opened on the target application.

According to an aspect of the present disclosure, a non-transitory computer-readable storage medium storing computer instructions is provided. The one or more programs comprising instructions, which when executed by one or more processors of an electronic device, cause the electronic device to: obtaining, from a target application, a first recommended item for being selected, where the target application is an application of interest to a target user; in response to the first recommended item for being selected matching target information of interest, triggering the target application to open a first sub-page corresponding to the first recommended item for being selected, where the target information of interest is information of interest to the target user; and determining a test result for the target application based on a matching degree between a first target recommended item and the target information of interest, where the first target recommended item comprises a first recommended item generated by the target application after the first sub-page is opened on the target application.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings are used for a better understanding of the solutions, and do not constitute a limitation on the present disclosure. In the accompanying drawings.

DETAILED DESCRIPTION OF EMBODIMENTS

Example embodiments of the present disclosure are described below in conjunction with the accompanying drawings, where various details of the embodiments of the present disclosure are included to facilitate understanding and should only be considered as an example. Therefore, those of ordinary skill in the art should be aware that various changes and modifications can be made to the embodiments described herein, without departing from the scope and spirit of the present disclosure. Likewise, for clarity and conciseness, the description of well-known functions and structures is omitted in the following description.

Figure 1:
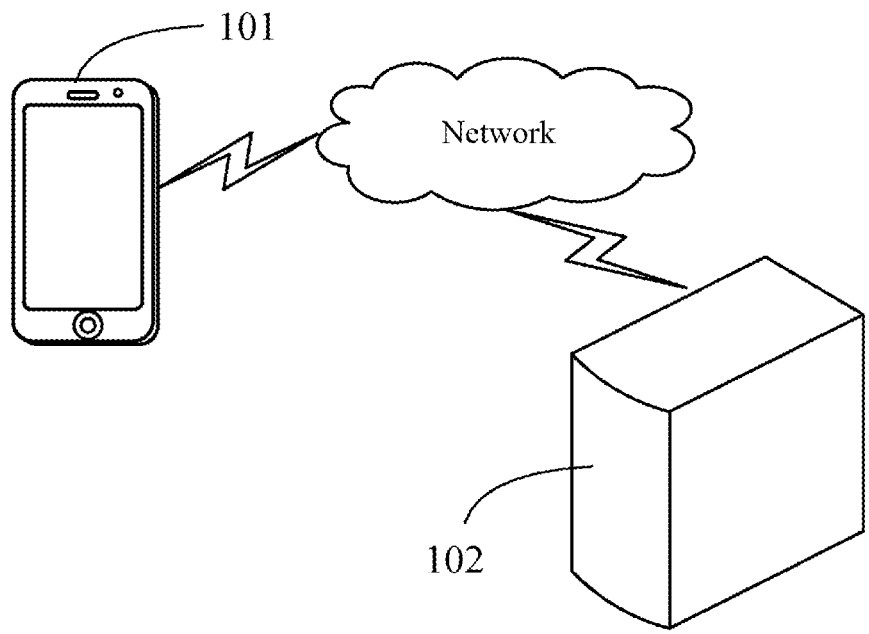
FIG. 1 is a diagram of an application scenario of a method for testing an application according to an embodiment of the present disclosure.

FIG. 1 is a diagram of an application scenario according to an embodiment of the present disclosure. As shown in FIG. 1, a terminal 101 may be hardware, for example, user equipment (UE), a mobile device, a cellular phone, a cordless telephone, a personal digital assistant (PDA), a handheld device, a computing device, a vehicle-mounted device, or a wearable device. The terminal 101 may alternatively be software or an APP. When the terminal 101 is software or an APP, it may be installed on the above device. A server 102 may provide various services, for example, provide support for an APP installed on the terminal 101.

A method for testing an application provided in an embodiment of the present disclosure may be executed by the terminal 101 or the server 102, and an apparatus corresponding to the method may be provided in the terminal 101 or the server 102. Any number of terminals, networks, and servers may be configured according to requirements.

Figure 2:
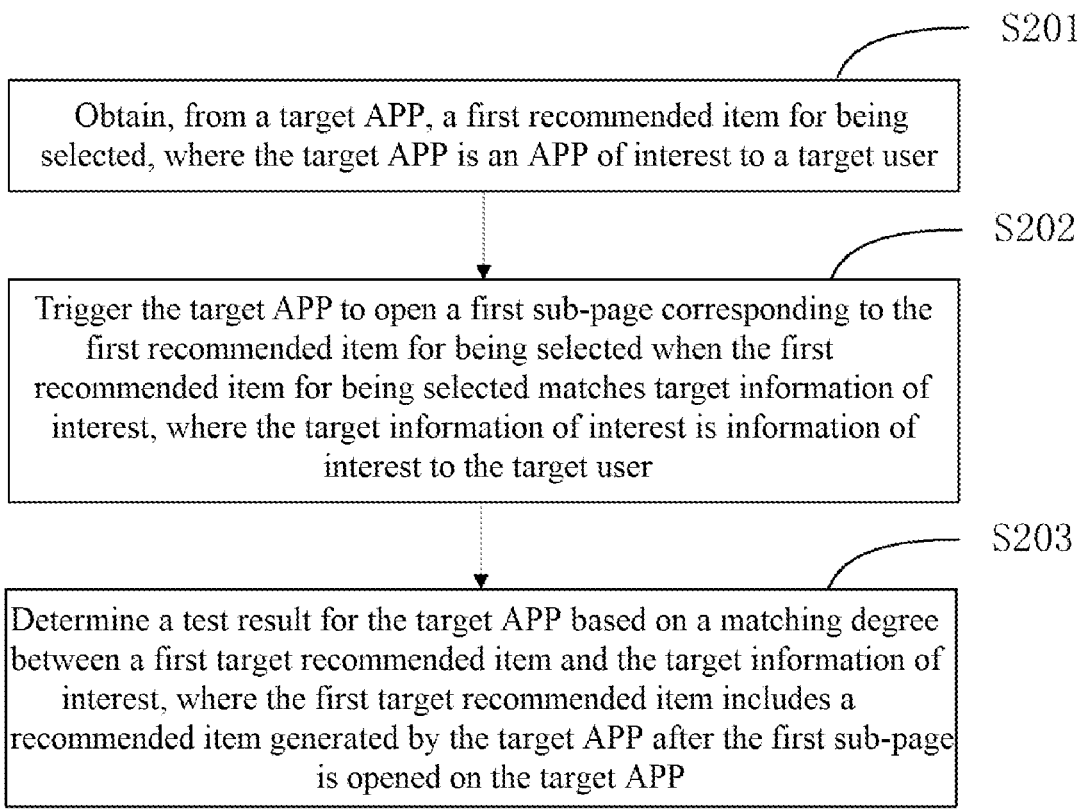
FIG. 2 is a flowchart of a method for testing an application according to an embodiment of the present disclosure.

FIG. 2 is a flowchart of a method for testing an application according to an embodiment of the present disclosure. As shown in FIG. 2, the test method may include:

step S201, obtaining, from a target APP, a first recommended item for being selected, where the target APP is an APP of interest to a target user;

step S202, in response to the first recommended item for being selected matching target information of interest, triggering the target APP to open a first sub-page corresponding to the first recommended item for being selected, where the target information of interest is information of interest to the target user; and step S203: determining a test result for the target APP based on a matching degree between a first target recommended item and the target information of interest, where the first target recommended item includes a first recommended item generated by the target APP after the first sub-page is opened on the target APP.

The target APP in the embodiment may be an APP to be tested, and the APP may recommend corresponding content based on a user portrait and further generate a recommended item. The target APP is usually an APP of interest to the target user. For example, if the target user is a sports enthusiast, the target APP may be Hupu, QSports, or the like. Correspondingly, the target information of interest is information of interest to the target user, such as sports news, sports events, and the like.

The test method in the embodiment may simulate the use of the target APP by the target user, so that a recommendation effect of the target APP is tested similarly to that is tested by humans.

As an example, when the test method in the embodiment is executed by the server 102, the target APP may be installed on the terminal 102. For example, the server 102 sends an installation instruction or an opening instruction for the target APP to the terminal 102, and then the terminal 102 may be triggered to install or open the target APP.

When the target APP is opened, a plurality of first recommended items for being selected may be displayed. The recommended items are represented in forms, including but not limited to, push information, a floating window, and a window, a tag, a content item, or a control embedded on a page of the APP, such as text information in a search box, recommended information on the page, a personalized channel, or the like.

In step S202, a sematic recognition for the first recommended item for being selected may be performed to obtain corresponding semantic information. The semantic information is compared with the target information of interest, and if the semantic information matches the target information of interest, it is determined that the corresponding first recommended item for being selected matches the target information of interest, and then the target APP is triggered to open the first sub-page corresponding to the first recommended item for being selected.

Based on this, a browse operation of the target user on the first recommended item for being selected may be simulated. The target APP may obtain the user portrait of the target user based on the browse operation to provide recommendations, that is, generate the first target recommended item. It should be noted that the test method provided in the embodiment of the present disclosure is not focused on how the target APP obtains the user portrait and how the target APP provides recommendations.

Further, a test result for the target APP is determined based on a matching degree between the first target recommended item from the target APP and the target information of interest.

Due to the first target recommended item is a recommended item generated after the simulation of the browse operation of the target user by the target APP, and the target information of interest reflects the user portrait of the target user, a recommendation accuracy, and a recommendation effect of the target APP may be tested based on the matching degree between the first target recommended item and the target information of interest.

In an implementation, user models may be preset. The user models may include APPs of interest and information of interest corresponding to each of a plurality of users with different attributes, respectively. Further, the test method in the embodiment of the present disclosure may include determining the target user from the preset user models, where the user models include APPs of interest and information of interest corresponding to a plurality of users with different attributes, respectively; and determining, from the user models, the target APP and target information of interest corresponding to the target user.

The attributes may be interests and hobbies, personality characteristics, or identity characteristics, etc. For example, APPs of interest corresponding to sports-loving users may include Hupu, QSports, etc., and information of interest to the users may be sports news, sports events, etc. APPs of interest corresponding to first-time mother users may include Babytree, DingXiangMaMa, etc., and information of interest to the users may be baby feeding products, complementary food production, etc.

Based on the preset user models, corresponding information of interest and APP of interest may be configured for different users, so that mobile phone users with different attributes are simulated, to test the target APP by simulating the use of the APP by the user.

In an implementation, the test method in the embodiment of the present disclosure may further include triggering a terminal to be installed with the target APP; and triggering, according to a first preset time condition, the terminal to open the target APP.

The first preset time condition may be set according to usage habits of common users. For example, when the target APP is a video APP, usage time of common users ranges generally from 19:00 to 23:00 according to usage habits of the users. In this case, the first preset time condition may be set to be from 19:00 to 23:00.

In this way, user behavior may be simulated more accurately, and test accuracy may be improved.

In an implementation, the test method in the embodiment of the present disclosure may further include triggering the target APP to perform a specified operation on the first sub-page after triggering the target APP to open a first sub-page corresponding to the first recommended item for being selected. Further, the first target recommended item includes a recommended item generated by the target APP after the specified operation is performed by the target APP.

The specified operation includes, but is not limited to, following, giving a like, commenting, and adding to favorites. As an example, when the test method in the embodiment is executed by the server 102, the target APP may be installed on the terminal 102. For example, the server 102 sends a specified operation instruction of following, giving a like, commenting, or adding to favorites to the target APP on the terminal 102, and then the target APP may be triggered to perform the specified operation of following, giving a like, commenting, or adding to favorites.

Since a real user may browse and further perform corresponding operations after browsing when using an APP, the APP may generate a user portrait based on these operations and provide recommendations. According to the method in the embodiment of the present disclosure, the further operation behavior of a user after browsing may be simulated, thereby the simulation authenticity is improved. Based on this, the target APP may generate the first target recommended item, and thus the test result obtained based on the matching degree between the first target recommended item and the target information of interest may be more accurate.

Figure 3:
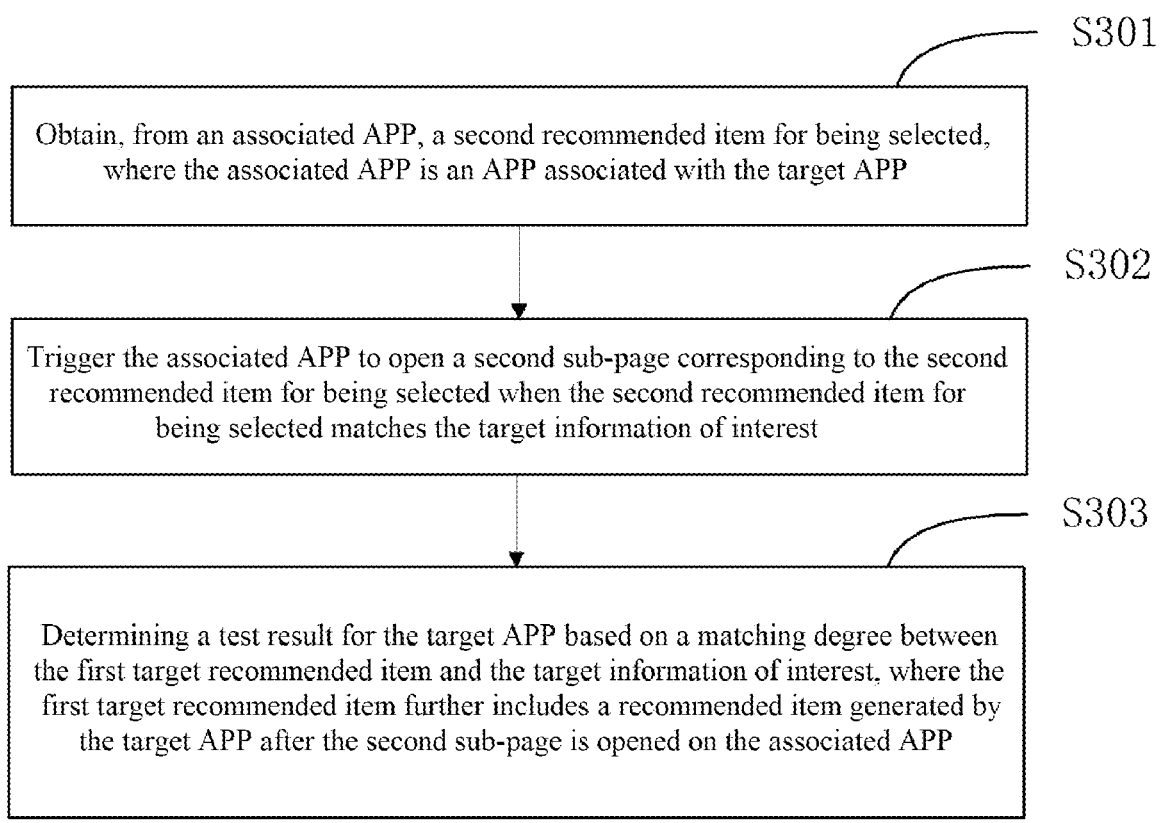
FIG. 3 is a flowchart of a method for testing an application according to an embodiment of the present disclosure.

In an implementation, as shown in FIG. 3, the test method in the embodiment of the present disclosure may include:

step S301, obtaining, from an associated APP, a second recommended item for being selected, where the associated APP is an APP associated with the target APP;

step S302, in response to the second recommended item for being selected matching the target information of interest, triggering the associated APP to open a second sub-page corresponding to the second recommended item for being selected; and step S303, determining a test result for the target APP based on a matching degree between the first target recommended item and the target information of interest, where the first target recommended item further includes a second recommended item generated by the target APP after the second sub-page is opened on the associated APP.

As an example, in an APP store, APPs are often tagged. The associated APP may have the same or associated tag as the target APP.

In an implementation, the preset user models may include APPs of interest of users with different attributes and may further include associated APPs corresponding to the APPs of interest. Further, the associated APP of the target APP may be obtained through the user models.

When the test method in the embodiment is executed by the server 102, the associated APP may be installed on the terminal 102. For example, the server 102 sends an installation instruction or an opening instruction for the associated APP to the terminal 102, and then the terminal 102 may be triggered to be installed with the associated APP or open the associated APP.

When the associated APP is opened, a plurality of second recommended items for being selected may be displayed. A semantic recognition for the second recommended items for being selected may be performed to obtain corresponding semantic information. The semantic information is compared with the target information of interest, and if the semantic information matches the target information of interest, it is determined that the corresponding second recommended item for being selected matches the target information of interest, and then the associated APP is triggered to open the second sub-page corresponding to the second recommended item for being selected.

When building builds a user portrait, the APP may usually obtain a list of APPs installed by a user and analyze usage habits of the user, so as to provide personalized recommendations. Therefore, according to the method in the embodiment of the present disclosure, the behavior of user using the associated APP may be simulated, so as to test whether the target APP can provide accurate recommendations based on the behavior of user using the associated APP, thereby improve the test dimension and test accuracy.

An implementation similar to that of step S203 may be used for step S303.

In an implementation, the test method in the embodiment of the present disclosure may further include triggering a terminal to be installed with the associated APP; and triggering, according to a second preset time condition, the terminal to open the associated APP.

Each of the first preset time condition and the second preset time condition may include an opening period, for example, open once or three times a day or open once a week, etc. The opening period in the first preset time condition may be less than that in the second preset time condition, that is, the associated APP is opened occasionally.

As an example, after the associated APP is triggered to open the second sub-page corresponding to the second recommended item for being selected, the associated APP is triggered to perform a specified operation on the second sub-page. Further, the first target recommended item may include a recommended item generated by the target APP after the specified operation is performed by the associated APP.

In an implementation, the test method in the embodiment of the present disclosure may further include: obtaining query information from the associated APP; triggering the target APP to search for the query information; and determining a test result for the target APP based on a matching degree between a second target recommended item and the query information, where the second target recommended item includes a third recommended item generated by the target APP after the query information is searched for on the target APP.

In a process of simulating the use of the associated APP by the user, some personalized query information may be collected. The query information may come from page content, push notifications, or the like. Then, search behavior on the target APP is simulated based on the query information.

A real user may have browse action and also search action when using the APP, and the APP may record these search records to generate the user portrait and provide recommendations better. For example, if the user searches for mobile phone on the APP, the APP may recommend mobile phones when a page is opened next time.

According to the method in the embodiment of the present disclosure, the search behavior of a user may be simulated, thereby improving the simulation authenticity. The target APP may generate the second target recommended item, and therefore, perform a test based on the matching degree between the second target recommended item and the query information may enhance the test dimension and the test accuracy.

In an implementation, step S203 may include: obtaining a plurality of first target recommended items from the target APP; determining matching degrees between each of the first target recommended items and the target information of interest; determining a proportion of recommended information corresponding to the first target recommended items that meet a matching degree threshold in all information displayed on a current page (a proportion of personalization); and determining a test result for the target APP based on the proportion.

A plurality of contents may be displayed on a page where the first target recommended item is located, and semantic analysis is performed on a target recommended item that meets the matching degree threshold and page content on the current page, to obtain target recommended information and information to be displayed on the page, respectively. The test result of the recommendation effect of the target APP may be obtained by determining the proportion of the target recommended information in the information to be displayed on the page (the proportion of personalization).

As an example, the above test may be performed circularly. A proportion of personalization is determined in each test, after a period, the test result of the recommendation effect of the target APP is determined based on a plurality of personalization proportions obtained.

In an application example, the test method in the embodiment may be performed based on a test system. The test system may include a plurality of modules, such as a system scheduling module, a content understanding module, and a data storage and statistics module. The modules may perform execution on the server 102.

The system scheduling module may be configured to call and install an APP, and may be configured for clicking a control, entering content, and other opening or specified operations or searching. The content understanding module may include a trained page content recognition model, which is configured to perform semantic analysis on page content, recommended items, and the like, and generate personalized tags, understand push information, identify page controls, and the like. The data storage and statistics module is configured to save content information on browsed pages, tags and push information of APPs generated by content understanding, and the like, including storage and statistics of page information and analysis of personalization proportions in each test.

Figure 4:
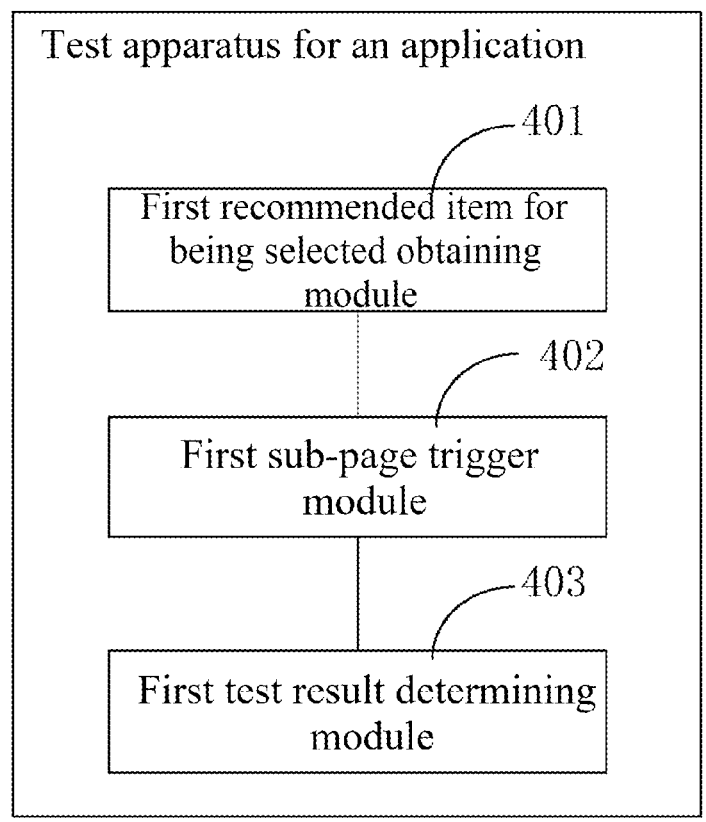
FIG. 4 is a block diagram of an apparatus for testing an application according to an embodiment of the present disclosure.

FIG. 4 is a structural block diagram of a test apparatus for an application according to an embodiment of the present disclosure. As shown in FIG. 4, the test apparatus may include:
  a first recommended item for being selected obtaining module 401 configured to obtain, form a target APP, a first recommended item for being selected, where the target APP is an APP of interest to a target user;
  a first sub-page trigger module 402 configured to, in response to the first recommended item for being selected matching target information of interest, trigger the target APP to open a first sub-page corresponding to the first recommended item for being selected, where the target information of interest is information of interest to the target user; and
  a first test result determining module 403 configured to determine a test result for the target APP based on a matching degree between a first target recommended item and the target information of interest, where the first target recommended item includes a first recommended item generated by the target APP after the first sub-page is opened on the target APP.

In an implementation, the test apparatus further includes:
  a first installation trigger module configured to trigger a terminal to be installed with the target APP; and
  a first opening trigger module configured to trigger, according to preset time condition, the terminal to open the target APP.

In an implementation, the test apparatus further includes:
  a specified operation execution trigger module configured to trigger the target APP to perform a specified operation on the first sub-page after the triggering the target APP to open a first sub-page corresponding to the first recommended item for being selected.

The first target recommended item further includes a recommended item generated by the target APP after the specified operation is performed for the target APP.

In an implementation, the test apparatus further includes:
  a second recommended item for being selected obtaining module configured to obtain, from an associated APP, a second recommended item for being selected, where the associated APP is an APP associated with the target APP; and
  a second sub-page trigger module configured to, in response to the second recommended item for being selected matching the target information of interest, trigger the associated APP to open a second sub-page corresponding to the second recommended item for being selected.

The first target recommended item further includes a second recommended item generated by the target APP after the second sub-page is opened on the associated APP.

In an implementation, the test apparatus further includes:
  a second installation trigger module configured to trigger a terminal to be installed with the associated APP; and
  a second opening trigger module configured to trigger, according to a second preset time condition, the terminal to open the associated APP.

In an implementation, the test apparatus further includes:
  a query information obtaining module configured to obtain query information from the associated APP;
  a search trigger module configured to trigger the target APP to search for the query information; and
  a second test result determining module configured to determine a test result for the target APP based on a matching degree between a second target recommended item and the query information, where the second target recommended item includes a third recommended item generated by the target APP after the query information is searched for on the target APP.

In an implementation, the test apparatus further includes:
  a target user determining module configured to determine the target user from preset user models, where the user models include APPs of interest and information of interest corresponding to each of a plurality of users with different attributes, respectively; and
  a target APP and target information of interest determining module configured to determine, from the user models, the target APP and target information of interest corresponding to the target user.

For the functions and effects of each unit, module, or sub-module in each apparatus in the embodiments of the present disclosure, reference may be made to the corresponding description in the foregoing method embodiments, and details are not described herein again.

In the technical solutions of the present disclosure, obtaining, storage, application, etc. of personal information of a user all comply with related laws and regulations and are not against the public order and good morals.

According to another aspect of the present disclosure, there is provided an electronic device, including: at least one processor; and a memory communicatively connected to the at least one processor, where the memory stores instructions executable by the at least one processor, and when executed by the at least one processor, the instructions cause the at least one processor to perform the method according to any one of the embodiments of the present disclosure.

According to another aspect of the present disclosure, there is provided a non-transitory computer-readable storage medium storing computer instructions, where the computer instructions are used to cause a computer to perform the method according to any one of the embodiments of the present disclosure.

According to another aspect of the present disclosure, there is provided a computer program product, including a computer program, where when the computer program is executed by a processor, the method according to any one of the embodiments of the present disclosure is implemented.

In the technical solutions of the present disclosure, obtaining, storage, application, etc. of personal information of a user all comply with related laws and regulations and are not against the public order and good morals.

Figure 5:
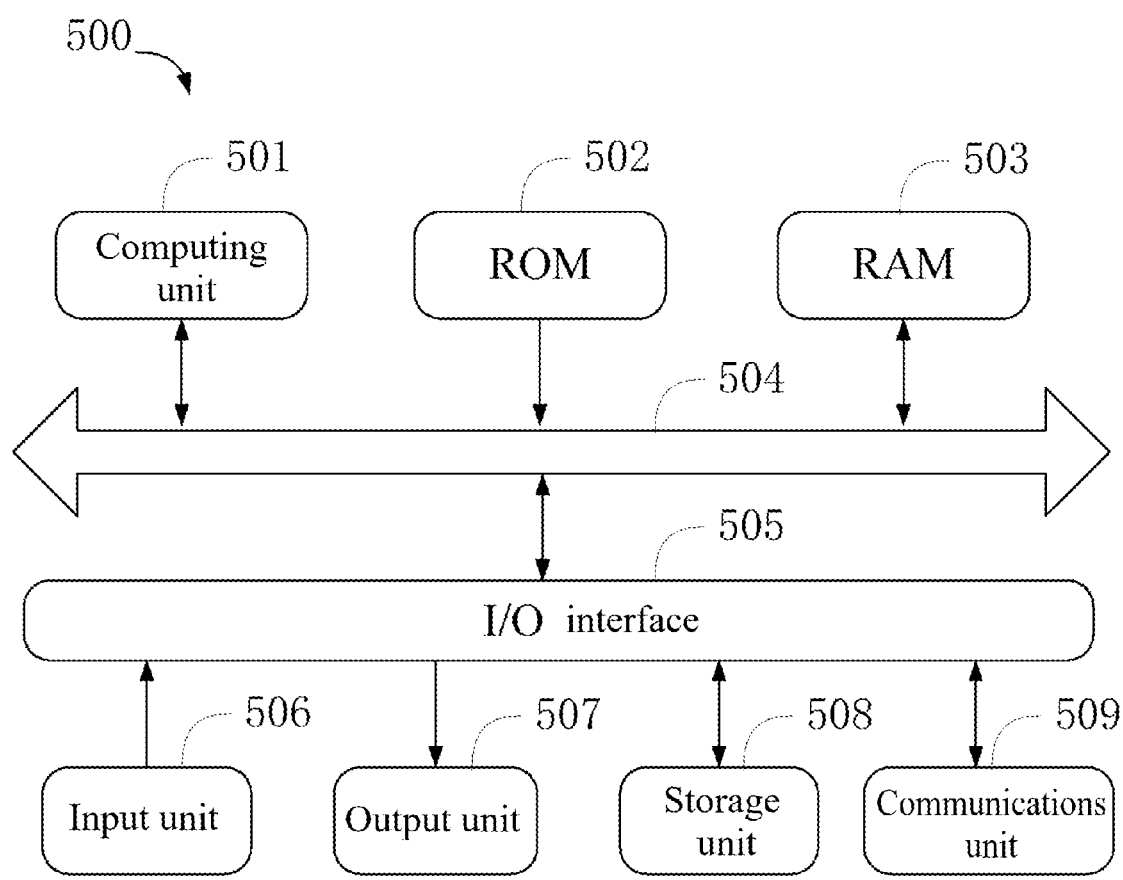
FIG. 5 is a block diagram of an electronic device for implementing a method for testing an application according to an embodiment of the present disclosure.

FIG. 5 is a schematic block diagram of an example electronic device 500 that may be used to implement the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 5, the device 500 includes a computing unit 501, which may perform various appropriate actions and processing according to a computer program stored in a read-only memory (ROM) 502 or a computer program loaded from a storage unit 508 to a random access memory (RAM) 503. The RAM 503 may further store various programs and data required for the operation of the device 500. The computing unit 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, such as a keyboard or a mouse; an output unit 507, such as various types of displays or speakers; a storage unit 508, such as a magnetic disk or an optical disc; and a communications unit 509, such as a network interface card, a modem, or a wireless communication transceiver. The communications unit 509 allows the device 500 to exchange information/data with other devices through a computer network, such as the Internet, and/or various telecommunications networks.

The computing unit 501 may be various general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 501 performs the various methods and processing described above, for example, the test method for an application. For example, in some embodiments, the test method for an application may be implemented as a computer software program, which is tangibly contained in a machine-readable medium, such as the storage unit 508. In some embodiments, a part or all of the computer program may be loaded and/or installed onto the device 500 via the ROM 502 and/or the communications unit 509. When the computer program is loaded onto the RAM 503 and executed by the computing unit 501, one or more steps of the test method for an application described above can be performed. Alternatively, in other embodiments, the computing unit 501 may be configured, by any other suitable means (for example, by means of firmware), to perform the test method for an application.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure can be performed in parallel, in order, or in a different order, provided that the desired result of the technical solutions disclosed in the present disclosure can be achieved, which is not limited herein.

The specific implementations above do not constitute a limitation on the protection scope of the present disclosure. Those skilled in the art should understand that various modifications, combinations, sub-combinations, and replacements can be made based on design requirements and other factors. Any modifications, equivalent replacements, improvements, etc. within the spirit and principle of the present disclosure shall fall within the protection scope of the present disclosure.

What is claimed is:

1. A method for testing an application, comprising:
    obtaining, from a target application, a first recommended item for being selected, wherein the target application is an application of interest to a target user;
    in response to the first recommended item for being selected matching target information of interest, triggering the target application to open a first sub-page corresponding to the first recommended item for being selected, wherein the target information of interest is information of interest to the target user; and
    determining a test result for the target application based on a matching degree between a first target recommended item and the target information of interest, wherein the first target recommended item includes a first recommended item generated by the target application after the first sub-page is opened on the target application.
2. The method according to claim 1, further comprising:
    triggering a terminal to be installed with the target application; and
    triggering, according to a first preset time condition, the terminal to open the target application.
3. The method according to claim 1, wherein after triggering the target application to open the first sub-page corresponding to the first recommended item for being selected, the method further comprises:
    triggering the target application to perform a specified operation on the first sub-page,
    wherein the first target recommended item further includes a recommended item generated by the target application after the specified operation is performed by the target application.
4. The method according to claim 1, further comprising:
    obtaining, from an associated application, a second recommended item for being selected, wherein the associated application is an application associated with the target application; and
    in response to the second recommended item for being selected matching the target information of interest, triggering the associated application to open a second sub-page corresponding to the second recommended item for being selected,
    wherein the first target recommended item further includes a second recommended item generated by the target application after the second sub-page is opened on the associated application.
5. The method according to claim 4, further comprising:
    triggering a terminal to be installed with the associated application; and
    triggering, according to a second preset time condition, the terminal to open the associated application.
6. The method according to claim 4, further comprising:
    obtaining query information from the associated application;
    triggering the target application to search for the query information; and
    determining a test result for the target application based on a matching degree between a second target recommended item and the query information, wherein the second target recommended item includes a third recommended item generated by the target application after the query information is searched for on the target application.
7. The method according to claim 1, further comprising:
    determining the target user from preset user models, wherein the preset user models include applications of interest and information of interest corresponding to a plurality of users with different attributes, respectively; and
    determining, from the preset user models, the target application and target information of interest corresponding to the target user.
8. An electronic device, comprising:
    one or more processors;
    a memory storing one or more programs configured to be executed by the one or more processors, the one or more programs comprises instructions for:
    obtaining, from a target application, a first recommended item for being selected, wherein the target application is an application of interest to a target user;
    in response to the first recommended item for being selected matching target information of interest, triggering the target application to open a first sub-page corresponding to the first recommended item for being selected, wherein the target information of interest is information of interest to the target user; and determining a test result for the target application based on a matching degree between a first target recommended item and the target information of interest, wherein the first target recommended item includes a first recommended item generated by the target application after the first sub-page is opened on the target application.

9. The electronic device according to claim 8, wherein the one or more programs further comprises instructions for:
triggering a terminal to be installed with the target application; and
triggering, according to a first preset time condition, the terminal to open the target application.

10. The electronic device according to claim 8, wherein the one or more programs further comprises instructions for:
triggering the target application to perform a specified operation on the first sub-page after triggering the target application to open the first sub-page corresponding to the first recommended item for being selected,
wherein the first target recommended item further includes a recommended item generated by the target application after the specified operation is performed by the target application.

11. The electronic device according to claim 8, wherein the one or more programs further comprises instructions for:
obtaining, from an associated application, a second recommended item for being selected, wherein the associated application is an application associated with the target application; and
in response to the second recommended item for being selected matching the target information of interest, triggering the associated application to open a second sub-page corresponding to the second recommended item for being selected,
wherein the first target recommended item further includes a second recommended item generated by the target application after the second sub-page is opened on the associated application.

12. The electronic device according to claim 11, wherein the one or more programs further comprises instructions for:
triggering a terminal to be installed with the associated application; and
triggering, according to a second preset time condition, the terminal to open the associated application.

13. The electronic device according to claim 11, wherein the one or more programs further comprises instructions for:
obtaining query information from the associated application;
triggering the target application to search for the query information; and
determining a test result for the target application based on a matching degree between a second target recommended item and the query information, wherein the second target recommended item includes a third recommended item generated by the target application after the query information is searched for on the target application.

14. The electronic device according to claim 8, wherein the one or more programs further comprises instructions for:
determining the target user from preset user models, wherein the preset user models include applications of interest and information of interest corresponding to a plurality of users with different attributes, respectively; and
determining, from the preset user models, the target application and target information of interest corresponding to the target user.

15. A non-transitory computer-readable storage medium storing one or more programs, the one or more programs comprising instructions, which when executed by one or more processors of an electronic device, cause the electronic device to:
obtaining, from a target application, a first recommended item for being selected, wherein the target application is an application of interest to a target user;
in response to the first recommended item for being selected matching target information of interest, triggering the target application to open a first sub-page corresponding to the first recommended item for being selected, wherein the target information of interest is information of interest to the target user; and
determining a test result for the target application based on a matching degree between a first target recommended item and the target information of interest, wherein the first target recommended item includes a first recommended item generated by the target application after the first sub-page is opened on the target application.

* * * * *